United States Patent [19]

Sharma et al.

[11] Patent Number: 5,043,376

[45] Date of Patent: Aug. 27, 1991

[54] LIQUID-DISPERSIBLE, POLYMERIC COLORANT COMPOSITIONS AND AQUEOUS DISPERSIONS

[75] Inventors: Mahendra K. Sharma; Terry A. Oldfield; James J. Krutak, all of Kingsport, Tenn.

[73] Assignee: Eastman Kodak Company, Rochester, N.Y.

[21] Appl. No.: 484,333

[22] Filed: Feb. 26, 1990

[51] Int. Cl.$^5$ .................. C08K 3/18; C08F 283/02; C08G 69/00
[52] U.S. Cl. ............................ 524/376; 525/421; 528/288
[58] Field of Search ............... 524/376; 528/288

[56] References Cited

U.S. PATENT DOCUMENTS

| 3,931,082 | 1/1976 | Cruz, Jr. et al. | |
|---|---|---|---|
| 4,112,215 | 9/1978 | Boessler et al. | |
| 4,116,924 | 9/1978 | Peabody | 524/270 |
| 4,177,177 | 12/1979 | Vanderhoff et al. | |
| 4,462,839 | 7/1984 | McGinley et al. | |
| 4,518,433 | 5/1985 | McGinley et al. | |
| 4,804,719 | 2/1989 | Weaver et al. | 525/420 |
| 4,912,157 | 3/1990 | Clark et al. | 524/265 |
| 4,960,814 | 10/1990 | Wu et al. | 524/312 |

OTHER PUBLICATIONS

Warner M. Linfield, Anionic Surfactants, Part II, [Marcel; Dekker, Inc.], New York; 1976, pp. 405-406, 425-427.

Primary Examiner—Joseph L. Schofer
Assistant Examiner—Wu C. Cheng
Attorney, Agent, or Firm—Bernard J. Graves, Jr.; J. Frederick Thomsen; William P. Heath, Jr.

[57] ABSTRACT

Disclosed are liquid-dispersible colorant compositions and stable aqueous dispersions of such colorant materials. The colorant is a polymeric colorant comprising a water-insoluble, polymeric colorant comprising a polyester having copolymerized therein residue of one or more monomeric, organic colorant compounds.

7 Claims, No Drawings

LIQUID-DISPERSIBLE, POLYMERIC COLORANT COMPOSITIONS AND AQUEOUS DISPERSIONS

This invention pertains to certain novel, liquid-dispersible colorant compositions in a finely-divided form comprising (i) a polyester having copolymerized therein the residues of one or more colorant compounds and (ii) one or more surfactant compounds. This invention also pertains to aqueous dispersions of the compositions and processes for the preparation of both the compositions and the dispersions.

An important factor which determines the color strength of a pigment is particle size and as the pigment particle size is reduced, colorant strength is increased to a maximum value For particle sizes greater than about 0.5 micron, Mie theory predicts that color strength is inversely proportional to particle diameter, and is approximately independent of refractive index of the particle relative to the medium and the absorption coefficient of the pigment Thus, particle size is of considerable importance to the utility and value of pigments.

Various processes for the manufacture of finely-divided forms of polyesters have been disclosed in the prior art such as U.S. Pat. Nos. 3,586,654, 3,669,922, 3,674,736, 3,931,082, 4,112,215, 4,254,207, 4,267,310, 4,305,864, 4,378,228, 4,451,606 and 4,462,839. Some of these known processes include the presence of pigments such as carbon black during particle size reduction to produce colored polyester powders. The known procedures are summarized below.

1. Comminution, as by grinding, which is difficult and expensive and results in highly irregular-shaped particles having a broad range of particle size distribution.
2. Spray drying techniques which tend to produce "hollow shells" or porous particles and also are hazardous when organic solvents are used to dissolve the polyester.
3. Dispersion processes which involve melting the polymer in an inert solvent in the presence of a non-ionic dispersing agent. Polyesters, in contrast to other thermoplastic polymers, tend to hydrolyze (decompose) when melted in the presence of water and the particles thus produced have a strong tendency to agglomerate or coalesce.
4. Heating under shearing agitation conditions a condensation polymer in an aprotic liquid which is not a solvent for the polymer and in the presence of a dispersing agent to form small liquid particles and cooling with agitation. Colorants added during this process are still extractable, sublimable, and may exude from the polymer.
5. Solvent induced crystallization wherein an amorphous polymer is initially contacted with a crystal-inducing fluid under certain conditions while the polymer is subjected to physical and/or ultrasonic forces. Colorants added during this process are not reacted with the polymer and therefore are subject to removal from the polymer.
6. Producing microcrystalline polyesters by a hydrolytic removal of amorphous regions of synthetic, linear polyesters followed by a mechanical disintegration of the resulting aggregated microcrystals.
7. Crystallization of polyesters in the presence of nucleating agents.

U.S Pat. No. 4,177,177 discloses a polymer emulsification process but does not provide for the preparation of dry powders.

Plastics, paints, printing inks, rubber, cosmetics and similar materials typically are colored by organic pigments when superior brilliance and tinctorial strength are important. Toxicity considerations have been a chronic problem relative to the use of organic pigments since some have been shown to be potential carcinogens and to cause contact dermatitis. Plastics usually contain various additives such as fillers, plasticizers, colorants, etc. The polymeric base of such plastics normally does not produce allergic or other adverse reactions by themselves but leachable or extractable additives are known [Fregert, Manual of Contact Dermatitis, Munkaard Denmark (2nd Ed. 1981)] to cause contact dermatitis.

One embodiment of our invention concerns a liquid-dispersible, polymeric colorant composition in the form of a powder comprising an intimate mixture of:

I. a water-insoluble, polymeric colorant comprising a linear, thermoplastic, linear polyester having copolymerized therein at least 5 weight percent, based on the weight of component I, of residues of one or more monomeric, organic colorant compounds;
and
II. an ionic, preferably anionic, or amphoteric surfactant.

Component I of the above-described compositions comprise crystalline, semi-crystalline and amorphous polyesters having copolymerized therein at least 5.0 weight percent of the residues of at least one monomeric, organic colorant compound The concentration of the colorant residue in the polyester is dependent on such factors as the end use for which a particular concentrate is designed, the polyester being used and the physical characteristics required of the color concentrate. Normally, the polymeric colorant will not contain more than 55 weight percent of colorant residues with a concentration in the range of about 10 to 40 weight percent being more common. Typically, the polymeric colorants have an inherent viscosity of at least 0.20 and are comprised of (i) a diacid component consisting of the residues of one or more dicarboxylic acids, (ii) a diol component consisting of the residues of one or more diols and (iii) a colorant component consisting of the residues of one or more colorant compounds. The concentration of colorant component (iii) and inherent viscosity are interrelated to the extent that the degree of polymerization and the inherent viscosity should be sufficiently high to ensure that substantially all of the colorant compound is reacted into the polymer and, preferably, into polymer chains which are not extractable. Thus, for example, when the concentration of colorant component (iii) is 20 weight percent or higher, the inherent viscosity of the polyester normally will be about 0.25 or higher.

The diacid residues may be derived from aliphatic, alicyclic, or aromatic dicarboxylic acids such as terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid and the like. In the polymer preparation, it is often preferable to derive the diacid residues from an ester-forming derivative of the dicarboxylic acid such as the dimethyl, diethyl, or dipropyl esters. The anhydrides or acid halides of these acids also may be employed where practical The diol components of the described polyesters may be selected from ethylene glycol, 1,2-propanediol, 1,3- propanediol, 2-methyl-1,3-propanediol, 1,4-butanediol, 2,2-dimethyl-1,3-propanediol, 1,6-hexanediol, 1,10-decanediol, 1,12-dodecanediol, 1,2-cyclohexanediol, 1,4-cyclohexanediol, 1,2-cyclohexanedimethanol, 1,3-cyclohexanedimethanol, 1,4-cyclohexanedimethanol, X,8-bis(hydroxymethyl)-tricyclo-[5.2.1.0]-decane wherein X represents 3, 4, or 5; and diols containing one or more oxygen atoms in the chain, e.g., diethylene glycol, triethylene glycol, dipropylene glycol, tripropylene glycol, 1,3- and 1,4.bis(2-hydroxyethyl)benzene and the like. In general, these diols contain 2 to 18, preferably 2 to 12 carbon atoms. Cycloaliphatic diols can be employed in their cis or trans configuration or as mixtures of both forms.

The amorphous polymeric colorants useful in our invention exhibit a glass transition temperature (Tg) and no, or only a trace of, crystallization or melting point by differential scanning calorimetry (DSC). Examples of such amorphous polyesters include those obtained by the polymerization of a monomeric colorant compound, terephthalic and/or 2,6-naphthalenedicarboxylic acid and a branched-chain diol having the formula

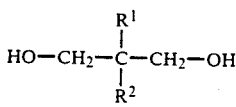

wherein $R^1$ is hydrogen or an unsubstituted or substituted alkyl, cycloalkyl or aryl radical and $R^2$ is an unsubstituted or substituted alkyl, cycloalkyl or aryl radical. Preferred amorphous polymeric colorants have an inherent viscosity of about 0.2 to 0.8 and are comprised of:

(i) diacid residues comprised of at least 50, preferably at least 80, mole percent terephthalic and/or 2,6-naphthalenedicarboxylic acid residues;

(ii) diol residues comprised of at least 50, preferably at least 80, mole percent of residues of a diol having the formula

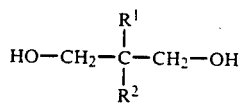

wherein $R^1$ is hydrogen or lower alkyl and $R^2$ is lower alkyl; and (iii) residues of a monomeric colorant compound. The particularly preferred amorphous polymeric colorants are comprised of (i) diacid residues consisting essentially of terephthalic and/or 2,6-naphthalenedicarboxylic acid residues; (ii) diol residues consisting essentially of 2,2-dimethyl-1,3-propanediol residues; and (iii) residues of one or more monomeric colorant compounds.

Other amorphous polyesters, as defined above, suitable for preparing the polymeric colorants may be obtained by employing (1) two dicarboxylic acids and one or more diols or (2) two diols and one or more dicarboxylic acids according to known procedures for obtaining amorphous polyesters. The polyester comprising a diacid component consisting of 75 mole percent terephthalic acid residues and 25 mole percent 1,4-cyclohexanedicarboxylic acid residues, a diol component consisting of 1,4-butanediol residues and residues of methine compound (I) is an example of such a polyester.

The partially-crystalline polymeric colorants usually exhibit a glass transition temperature, a crystallization temperature and a melting temperature by DSC. These partially-crystalline, polyester colorants are comprised of (i) diacid residues consisting of at least 80 mole percent terephthalic acid residues, 2,6-naphthalenedicarboxylic acid residues, 1,3-cyclohexanedicarboxylic acid residues, 1,4-cyclohexanedicarboxylic acid residues or a mixture thereof, (ii) diol residues consisting of at least 50 mole percent of residues having the formula $-O-(CH_2)_p-O-$ wherein p is 2, preferably 4, to 12 and (iii) residues of colorant compound (I). A preferred partially-crystalline polymeric colorant has a melting temperature of at least 110° C. and is comprised of (i) diacid residues comprised of at least 80 mole percent terephthalic acid residues, (ii) diol residues comprised of at least 80 mole percent of residues of 1,4-butanediol, and (iii) residues of one or more monomeric, colorant compounds. An especially preferred partially-crystalline polymeric colorant has a melting temperature of at least 110° C. and consists essentially of (i) terephthalic acid residues, (ii) 1,4-butanediol residues and (iii) residues of one or more monomeric colorant compounds.

The monomeric, organic colorant compounds useful in the preparation of the polymeric colorants of component I of our novel compositions are not a critical feature of our invention. The essential characteristics of the colorant compounds are (1) sufficient thermal stability to permit copolymerization with the above-described polyesters and (2) the presence on the structure of colorant compounds of 2 substituents which are reactive with at least one of the monomers from which the polyesters are prepared. The colorant compounds may be selected from anthraquinone, methine, bis-methine, 3H-dibenzo[f,ij]isoquinoline (anthrpyridone), 2,5-diarylaminoterephthalic acid or ester, 2H-1-benzopyran-2-one (coumarin), quinophthalone, perylene and other thermally-stable colorant compounds. Representative compounds useful in preparing the polymeric colorants employed in the compositions provided by this invention are described in U.S. Pat. Nos. 4,267,306, 4,359,570, 4,403,092, 4,617,373, 4,080,355, 4,740,581, 4,116,923, 4,745,173 and 4,804,719. Examples of the reactive substituents present on the colorant compounds include hydroxy, carboxy, an ester radical, amino, alkylamino, and the like. The ester radicals may be any radical having the formula

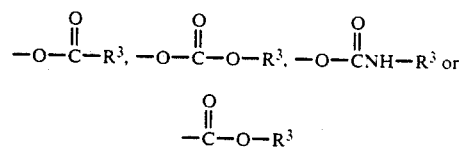

wherein $R^3$ is selected from the unsubstituted or substituted alkyl, cycloalkyl or aryl radicals. $R^3$ preferably is unsubstituted alkyl, e.g., alkyl of up to about 8 carbon atoms, or phenyl, and most preferably, lower alkyl, e.g., methyl and ethyl.

Examples of the anthraquinone colorants include compounds having the formula

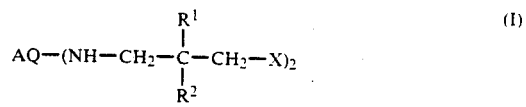

wherein

AQ is a 1,5- or 1,8-anthraquinonylene radical, i.e., radicals having the structure

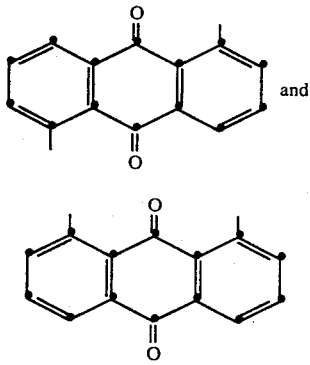

and $R^1$ is hydrogen or an unsubstituted or substituted alkyl, cycloalkyl or aryl radical; $R^2$ are the same or different and are unsubstituted or substituted alkyl, cycloalkyl or aryl;

$R^2$ is an unsubstituted or substituted alkyl, cycloalkyl or aryl radical; and

X is a group reactive with at least one of the functional groups of the monomers from which the polyester is prepared, i.e., one of the reactive groups described hereinabove.

Examples of the useful monomeric methine colorants include compounds having the formula

(II)

wherein

A is an aniline, 1,2,3,4-tetrahydroquinoline, 2,3-dihydro-1,4-benzoxazine or 2,3-dihydroindole residue of a methine colorant compound bearing one polyester-reactive substituent; and B is an unsubstituted or substituted alkoxycarbonyl radical or an aromatic, carbocyclic or heterocyclic radical bearing one polyester-reactive substituent, i.e., a group reactive with at least one of the functional groups of the monomers from which the polyester is prepared; provided that the methine colorant compound contains two polyester-reactive substituents.

The crystallinity of the polymeric colorants prepared as described herein may be modified by subjecting them to a dissolution-crystallization-precipitation procedure wherein the amorphous or partially-crystalline polymeric colorants are dissolved in an organic solvent from which the polymeric colorant is recovered in a finely divided form. Examples of the solvents in which such polymeric colorants may be dissolved include halogenated hydrocarbons, such as aliphatic chlorides, e.g., methylene chloride, esters such as alkyl esters of carboxylic acids, e.g., ethyl acetate and methyl benzoate, hydrocarbons such as toluene and ethers such as tetrahydrofuran. Methylene chloride is a particularly effective solvent for use in the dissolution-crystallization-precipitation procedure.

The ionic or amphoteric surfactants constituting component II of the compositions of our invention may be selected from a wide variety of known, commercially-available compounds and compositions. Examples of the anionic surfactants include alkali salts of higher fatty acids, e.g., carboxylic acids having about 12 to 24 carbon atoms, especially sodium stearate; alkali metal and alkaline earth stearoyl lactylates such as sodium and calcium stearoyl lactylates; glyceroyl esters such as phosphated mono- and di-glycerides, citric acid esters of monoglycerides, diacetylated tartaric acid esters of monoglycerides, sulfonated esters; and alphatocopherol-hemisuccinate. Examples of the anionic and amphoteric surfactants include soy phosphatides, phospholipids, lysophospholipids, etc. such as mono- and di-acyl phosphatidylcholine, phosphatidic acid, esters of monoglycerides, sulfonated esters; and alphatocopherol-hemisuccinate-phosphatidyl ethanolamine, etc.

The amount of component II can vary substantially, e.g. from about 0.5 to 30 weight percent, preferably about 1.0 to 10 weight percent, based on the weight of the polymeric colorant. Factors which may be considered in determining the amount of component II used include the particular polymeric colorant used, the particular process (described hereinbelow) used to manufacture the composition, the amount, if any, of a nonionic surfactant (Component III defined hereinbelow) present, the particular end use for which the composition is intended, etc. The surfactant constituting component II preferably is an anionic surfactant, especially an alkali metal salt of a carboxylic acid having about 16 to 20 carbon atoms present in an amount which is about 1.0 to 10 weight percent based on the weight of the polymeric colorant.

The liquid-dispersible, colorant compositions described above based on components I and II are readily dispersible in oil-based compositions by milling the composition and an oil-based material, e.g., castor oil, mineral oil, propylene glycol, petrolatum, etc., using conventional pigment milling equipment such as a threeroll mill or a colloid mill. The particles of the essentially-dry colorant compositions comprise aggregates of generally spherical particles of the polymeric colorant obtained by the process described hereinafter. The spherical particles typically have an average particle size of about 2 microns or less and contain the ionic surfactant on the surface thereof A second embodiment of our novel liquid-dispersible, colorant compositions is a powder which contains an additional surfactant material and comprises an intimate mixture of:

I. a water-insoluble, polymeric colorant comprising a linear, thermoplastic, linear polyester having copolymerized therein at least 5 weight percent, based on the weight of component I, of residues of one or more monomeric, organic colorant compounds;

II. an ionic, preferably anionic, or amphoteric surfactant; and

III. a nonionic poly(oxyalkylene) surfactant having an average molecular weight of at least 300, preferably about 1000 to 15,000, having a hydrophobic-lipophobic value of about 10 or greater.

These compositions, which also are comprised of aggregates of small, generally spherical particles of components I, II and III, are dispersible in oils or oil-like materials by conventional milling techniques.

The nonionic, poly(oxyalkylene) surfactants constituting the surfactant of component III of the colorant compositions defined above are known materials available from several manufacturers under the tradenames Tergitol, Pluronic, Altox, Tween, Myrj, Brij and Rexene. Many of these poly(oxyalkylene) compounds may be characterized by formula $$R^4O-(-alkylene-O-)_n-R^5 \quad (III)$$

wherein $R^4$ is hydrogen or alkanoyl, e.g., a carboxylic acid acyl residues containing up to about 30 carbon atoms, preferably about 12 to 24 carbon atoms; $R^5$ is hydrogen, alkanoyl, alkyl of up to 24 carbon atoms, typically alkyl of about 12 to 18 carbon atoms, cycloalkyl, aryl including aryl substituted with alkyl of up to about 12 carbon atoms such as nonylphenyl, or an anhydromonosaccaride residue, e.g., an anhydrosorbitol (sorbitan) residue; the alkylene residue contains 2 to about 4 carbon atoms, especially ethylene or propylene; and n is the value required for a polymer having (i) a molecular weight of about 1000 to 15,000 and (ii) a HLB value of 10 or greater. The alkylene-O residue may consist of the same repeating unit or may be a random or block mixture of a plurality of repeating units, e.g., combinations of oxyethylene and oxypropylene units.

The amount of component III employed can vary considerably depending on a number of factors such as the particular polymeric colorant, the particular process (described hereinbelow) used to manufacture the composition, the specific ionic or amphoteric surfactant (Component II), and the amount thereof, used, the particular end use for which the composition is intended, etc. Generally, the amount of component III will be in the range of about 0.5 to 50 weight percent based on the weight of the polymeric colorant, with amounts in the range of about 1.0 to 20.0 weight percent being more typical.

Typically, the combined weight of Components II and III is about 1.0 to 50, preferably about 2.0 to 20 percent, based on the total weight of Components I, II and III.

The novel aqueous dispersions provided by this invention may be prepared in accordance with the process described below and comprise a mixture of:

(1) a water-insoluble, polymeric colorant comprising a linear, thermoplastic, linear polyester having copolymerized therein at least 5 weight percent, based on the weight of the polymeric colorant, of residues of one or more monomeric, organic colorant compounds;

(2) an ionic, preferably anionic, or amphoteric surfactant; and (3) water.

Polymeric colorant (1) may comprise from about 4 to 25 weight percent of the total weight of the dispersion, i.e., the total weight of (1), (2) and (3) with polymeric colorant concentrations of about 10 to 20 weight percent (same basis) being more typical. The amount of surfactant (2) present is the same as that described above relative to the polymeric colorant compositions.

The water of the aqueous dispersions may be removed according to known drying techniques, e.g., spray drying, freeze drying or pan drying, to obtain the liquid-dispersible compositions described hereinabove. The temperature used in the drying operation should be less than the glass transition temperature or melting temperature, depending on the nature of the polymeric colorant, of the Component I colorant material. Thus, the drying temperature normally will not exceed about 140° C. The dry polymeric composition may be dispersed in various organic liquids as described hereinabove. The liquid medium of choice will depend on the end use for which the dispersion is intended. For example, the polymeric colorant composition may be milled in castor oil for use in a lipstick or in mineral oil for use in a water-in-oil cleansing cream.

The aqueous dispersions of this invention preferably contain a nonionic poly(oxyethylene) surfactant and therefore the preferred aqueous dispersions comprise a mixture of:

(1) a water-insoluble, polymeric colorant comprising a linear, thermoplastic, linear polyester having copolymerized therein at least 5 weight percent, based on the weight of component I, of residues of one or more monomeric, organic colorant compounds wherein the polymeric colorant has an average particle size of less than 2 microns, preferably an average particle size of about 0.1 to 1.0 microns;

(2) an ionic, preferably anionic, or amphoteric surfactant;

(3) a nonionic poly(oxyalkylene) surfactant having an average molecular weight of at least 300, preferably about 1000 to 15,000, having a hydrophobic-lipophobic value of about 10 or greater; and (4) water.

The concentration of colorant (1) and surfactant (2) in the preferred dispersions is the same as that set forth above whereas the concentration of surfactant (3) is the same as that of Component III of the compositions relative to the amount of polymeric colorant present in the dispersion. The presence of nonionic surfactant (3) improves the stability of the dispersions by preventing, or at least retarding, the aggregation or agglomeration of the particles of polymeric colorants to form larger particles.

The aqueous, polymeric colorant dispersions described above may be produced by the process of our invention which comprises the steps of:

(1) forming an oil-in-water (o/w) emulsion from water and a solution of Component I (polymeric colorant) in a volatile, water-immiscible, organic solvent in the presence of Component II (ionic surfactant) and, optionally, Component III; and (2) removing from the emulsion of (1) the volatile, organic solvent.

The organic solvent used in Step (1) of our novel process may consist of one or more water-immiscible organic liquids capable of dissolving the polymeric colorant employed. The useful solvents or solvent systems have boiling points less than 100° C., preferably in the range of about 35° to 80° C. Example of such solvents include aliphatic and alicyclic hydrocarbons such as n-hexane, cyclohexane, cyclopentane, methylcyclopentane, 2-methylpentane, 3-methylpentane and the like; chlorinated hydrocarbons such as methylene chloride, ethylene dichloride, chloroform and the like; alkyl esters of aliphatic carboxylic acids such as ethyl acetate; and dialkyl ethers such as diisopropyl ether. The solvent preferably is an organic solvent system which includes, in addition to one or more water-immiscible organic liquids, a volatile, polar, water-miscible solvent such as acetone and alkanols of up to about 4 carbon atoms. For example, the solvent system of methylene chloride and isopropanol is particularly useful in conjunction with polymeric colorants based on poly(2,2-dimethyl-1,3-propanediyl terephthalate). Numerous other substantially volatile, water-immiscible solvent systems commonly used in the coatings industry for dissolving polymeric materials may be used in the practice of the process described herein.

The concentration of the polymeric colorant in the volatile, water-immiscible solvent may be varied substantially but usually will be in the range of colorant:solvent weight ratio of about 1:20 to 1:2, more commonly about 1:10 to 1:3. The weight ratio of the solution of the polymeric colorant to water used in the emulsification step generally is in the range of about 4:3 to 1:3 with a range of about 2:3 being preferred.

The ionic surfactant (Component II) and optional nonionic surfactant (Component III) employed in the emulsification operation of Step (1) may be combined with the water used or with the organic phase, i.e., the solution of the polymeric colorant. The amounts of Components II and III which may be used are the same as the amounts of those materials described above relative to the polymeric colorant compositions and aqueous dispersions. The emulsification in Step (1) may be accomplished by combining the water with the organic phase while submitting the resulting 2-phase mixture to emulsifying action such as agitation or comminution. The water may be added to the organic phase or the organic phase may be added to the water, which may contain one or both of Components II and III. Although temperature is not critical, the emulsification operation typically is carried out at a temperature of about 25° to 40° C.

In Step (2), the emulsion of Step (1) is broken by vaporizing essentially all of the organic phase of the emulsion resulting in a fine dispersion of the polymeric colorant in the remaining water. The vaporization of the organic phase, i.e., the water-immiscible solvent and any water-miscible solvent used, is advantageously accomplished by distillation under reduced pressure, e.g., at pressures of about 100 to 650 torr. The aqueous dispersion of the polymeric colorant produced may be used for the coloration of water-based products or may be dried as described above to obtain the polymeric colorant compositions.

The polymeric compositions, aqueous dispersions and process of our invention are further illustrated by the following examples. The inherent viscosities specified herein are determined at 25° C. using 0.5 g of polymer (polyester color concentrate) per 100 mL of a solvent consisting of 60 weight percent phenol and 40 weight percent tetrachloroethane. The melting temperatures are determined by differential scanning calorimetry on the first and/or second heating cycle at a scanning rate of 20° C. per minute and are reported as the peaks of the transitions. All particle sizes given herein are in microns and were determined using a Microtrac small particle analyzer (Leeds and Northrup). Results are reported as the maximum particle size for a particular volume percent of the total dispersed phase.

REFERENCE EXAMPLE 1

The following materials are placed in a 500-mL three-necked, round-bottom flask:
117.2 g (0.604 mol) dimethyl terephthalate
109.9 g (1.056 mol) 2,2-dimethyl-1,3-propanediol
0.0170 g Ti from a n-butanol solution of titanium tetraisopropoxide
14.19 g (0.030 mol) 2,2,-[(9,10-dihydro-9,10-dioxo-1,5-anthracenediyl)diimino]bis-benzoic acid having the structure

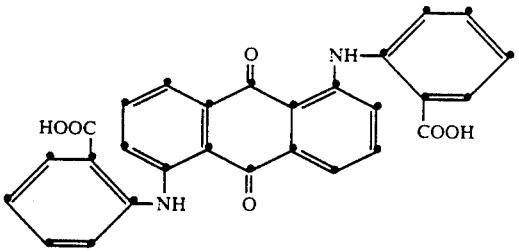

The flask is equipped with a nitrogen inlet, stirrer, vacuum outlet, and condensing flask. The flask and contents are heated in a Belmont metal bath with a nitrogen sweep over the reaction mixture as the temperature is increased to 200° C. and then to 220° C. over 90 minutes. Over the next 30 minutes the temperature is increased to about 240° C. and then to about 260° C. over the next 30 minutes. The temperature is quickly raised (over about 10 minutes) to 275° C. and a vacuum is applied until the pressure is reduced to 0.5 mm Hg. The polycondensation is completed by heating the flask and contents at about 275° C. for 75 minutes under a pressure of 0.1 to 0.5 mm Hg. The flask is removed from the metal bath and is allowed to cool while the polymer solidifies. The resulting dark red polyester, containing 8.0 weight percent of the anthraquinone colorant residue, has an inherent viscosity of 0.37, no melting temperature, a weight average molecular weight of 29,399, a number average molecular weight of 15,636 and a polydispersity value of 1.88.

The polymeric colorant obtained is modified by a dissolution-crystallization-precipitation procedure to impart crystallinity thereto. To ethyl acetate (450 mL) heated to 70° C. is added the polymeric colorant (90.0 g) with stirring. The temperature is increased to 85° C. to dissolve the colorant and, after refluxing for 1 hour, the temperature is decreased at the rate of 1° C. per minute to 25° C. The mixture is stirred for 4 hours at room temperature and allowed to stand overnight to allow precipitation of the polymeric colorant. The precipitate is filtered, washed 3 times with acetone and filtered after each washing and dried under vacuum at 40° C. The total modified polymeric colorant thus obtained is 60.2 g.

REFERENCE EXAMPLE 2

The following materials are placed in a 500-mL three-necked, round-bottom flask:
84.09 g (0.433 mol) dimethyl terephthalate
58.60 g (0.563 mol) 2,2-dimethyl-1,3-propanediol
0.0165 g Ti from a n-butanol solution of titanium tetraisopropoxide
85.14 g (0.208 mol) 1,5-bis[(3-hydroxy-2,2-di-methylpropyl)amino]anthraquinone The flask is equipped with a nitrogen inlet, stirrer, vacuum outlet, and condensing flask. The flask and contents are heated in a Belmont metal bath with a nitrogen sweep over the reaction mixture as the temperature is increased to 200° C. and then to 220° C. over 90 minutes. Over the next 30 minutes the temperature is increased to about 240° C. and then to about 260° C. over the next 30 minutes. The temperature is quickly raised (over about 10 minutes) to 275° C. and a vacuum is applied until the pressure is reduced to 0.5 mm Hg. The polycondensation is completed by heating the flask and contents at about 275° C. for 75 minutes under a pressure of 0.1 to 0.5 mm Hg. The flask is removed from the metal bath and is allowed to cool while the polymer solidifies. The resulting dark red polyester, containing 51.6 weight percent of the anthraquinone colorant residue, has an inherent viscosity of 0.357, no melting temperature, a weight average molecular weight of 22,101, a number average molecular weight of 10,157 and a polydispersity value of 2.18.

The polymeric colorant obtained is modified by a dissolution-crystallization-precipitation procedure to impart crystallinity thereto. To ethyl acetate (500 mL) heated to 70° C. is added slowly the polymeric colorant (75.0 g) with stirring. The temperature is increased to 80° C. and then refluxed for 2 hours with stirring. Heating is discontinued and the mixture is allowed to cool overnight to effect precipitation of the polymeric colorant. The precipitate is filtered, washed 4 times with acetone and filtered after each washing and dried under vacuum at 40° C. to obtain 58.76 g of modified polymeric colorant.

REFERENCE EXAMPLE 3

The following materials are placed in a 500-mL three-necked, round-bottom flask:
  108.64 g (0.56 mol) dimethyl terephthalate
  75.71 g (0.73 mol) 2,2-dimethyl-1,3-propanediol
  0.0170 g Ti from a n-butanol solution of titanium tetraisopropoxide
  52.0 g (0.127 mol) 1,5-bis[(3.hydroxy-2,2-di-methylpropyl)amino]anthraquinone The flask is equipped with a nitrogen inlet, stirrer, vacuum outlet, and condensing flask. The flask and contents are heated in a Belmont metal bath with a nitrogen sweep over the reaction mixture as the temperature is increased to 200°.C. and then to 220° C. over 90 minutes. Over the next 30 minutes the temperature is increased to about 240° C. and then to about 260° C. over the next 30 minutes. The temperature is quickly raised (over about 10 minutes) to 275° C. and a vacuum is applied until the pressure is reduced to 0.5 mm Hg. The polycondensation is completed by heating the flask and contents at about 275° C. for 75 minutes under a pressure of 0.1 to 0.5 mm Hg. The flask is removed from the metal bath and is allowed to cool while the polymer solidifies. The resulting dark red polyester, containing 30.6 weight percent of the anthraquinone colorant residue, has an inherent viscosity of 0.47, no melting temperature, a weight average molecular weight of 31,169, a number average molecular weight of 16,982 and a polydispersity value of 1.83.

This polymeric colorant (57.2 g) is submitted to a dissolution-crystallization-precipitation procedure substantially as described in Reference Example 1 to produce 45.15 g of modified colorant.

REFERENCE EXAMPLE 4

The following materials are placed in a 500-mL three-necked, round-bottom flask:
  112.97 g (0.643 mol) dimethyl naphthalene-2,6-dicarboxylate
  62 50 g (0.601 mol) 2,2-dimethyl-1,3-propanediol
  0.0170 g Ti from a n-butanol solution of titanium tetraisopropoxide
  51.66g (0.126 mol) 1,5-bis[(3-hydroxy-2,2-di-methylpropyl)amino]anthraquinone The flask is equipped with a nitrogen inlet, stirrer, vacuum outlet, and condensing flask. The flask and contents are heated in a Belmont metal bath with a nitrogen sweep over the reaction mixture as the temperature is increased to 200° C. and then to 220° C. over 90 minutes. Over the next 30 minutes the temperature is increased to about 240° C. and then to about 260° C. over the next 30 minutes. The temperature is quickly raised (over about 10 minutes) to 275° C. and a vacuum is applied until the pressure is reduced to 0.5 mm Hg. The polycondensation is completed by heating the flask and contents at about 275° C. for 75 minutes under a pressure of 0.1 to 0.5 mm Hg. The flask is removed from the metal bath and is allowed to cool while the polymer solidifies. The resulting dark red polyester, containing 30.4 weight percent of the anthraquinone colorant residue, has an inherent viscosity of 0.37, no melting temperature, a weight average molecular weight of 24,390, a number average molecular weight of 13,046 and a polydispersity value of 1.87.

REFERENCE EXAMPLE 5

The following materials are placed in a 500-mL three-necked, round-bottom flask:
  126.1 g (0.65 mol) dimethyl terephthalate
  94.6 g (0.91 mol) 2,2-dimethyl-1,3-propanediol
  0.0182 g Ti from a n-butanol solution of titanium tetraisopropoxide
  33.0 g (0.10 mol) methyl 3-[4-[[2-(acetyloxy)-ethyl]ethylamino]-2-methylphenyl]-2-cyano-2-propenoate having the structure:

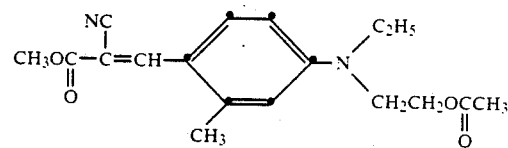

The flask is equipped with a nitrogen inlet, stirrer, vacuum outlet, and condensing flask. The flask and contents are heated in a Belmont metal bath with a nitrogen sweep over the reaction mixture as the temperature is increased to 200° C. and then to 220° C. over 90 minutes. Over the next 30 minutes the temperature is increased to about 240° C. and then to about 260° C. over the next 30 minutes. The temperature is quickly raised (over about 10 minutes) to 275° C. with a stream of nitrogen bleeding into the system and a vacuum is applied until the pressure is reduced to 0.5 mm Hg. The polycondensation is completed by heating the flask and contents at about 275° C. for about 1.25 hours under a pressure of 0.1 to 0.5 mm Hg. The flask is removed from the metal bath and is allowed to cool while the polymer solidifies. The resulting high molecular weight yellow polyester, containing 18.1 weight percent of the methine colorant residue, has an inherent viscosity of 0.20, no melting temperature, a weight average molecular weight of 13,732, a number average molecular weight of 8773 and a polydispersity value of 1.56.

The polymeric colorant obtained is modified by a dissolution-crystallization-precipitation procedure to impart crystallinity thereto. To ethyl acetate (450 mL) heated to 70° C. is added the polymeric colorant (90.0 g) with stirring. The temperature is increased to 85° C. to dissolve the colorant and, after refluxing for 1 hour, the temperature is decreased at the rate of 1° C. per minute to 25° C. The mixture is stirred for 4 hours at room temperature and allowed to stand overnight to allow precipitation of the polymeric colorant. The precipitate is filtered, washed 3 times with acetone and filtered after each washing and dried under vacuum at 40° C. The total modified polymeric colorant thus obtained is 60.2 g.

REFERENCE EXAMPLE 6

The procedure described in Reference Example 5 is repeated using the following materials:
131.4 g (0.68 mol) dimethyl terephthalate
94.6 g (0.91 mol) 2,2-dimethyl-1,3-propanediol
0.0180 g Ti from a n-butanol solution of titanium tetraisopropoxide
17.8 g (0.54 mol) methyl 3-[4-[[2-(acetyloxy)-ethyl]ethylamino]-2-methylphenyl]-2-cyano-2-propenoate The dark yellow polyester obtained contains 10.0 weight percent of the methine colorant residue, has an inherent viscosity of 0.59, a weight average molecular weight of 41,296, a number average molecular weight of 22,421 and a polydispersity value of 1.84.

The polymeric colorant is modified by the dissolution-crystallization-precipitation described in Reference Example 1 to obtain 81.2 g of modified product.

EXAMPLE 1

To a solution of the polymeric colorant (62.0 g) of Reference Example 1 in a mixture of methylene chloride (300.0 g) and isopropanol (100 g) at 25° C. are added a poly(oxyalkylene)glycol having an average molecular weight of 3500 and a HLB value of 26.1 (5.5 g; Tergitol XH) and sodium stearate (1.0 g). Water (600.0 g; 25° C.) is added drop-wise to the polymeric colorant solution at 25° C. over a period of 15 minutes while subjecting the mixture to comminuting force using a Ross homogenizer to form an oil-in-water emulsion. The emulsion is transferred to a laboratory Rotovap apparatus and the methylene chloride and isopropanol are removed at 40° C. and 100–650 torr to yield a latex-like colloidal dispersion of the polymeric colorant which is stable for several days. If any settling occurs after sitting for several weeks, the colorant may be redispersed by agitation. The solids content (determined gravimetrically) of the aqueous dispersion is approximately 14 weight percent and the particle sizes and distribution of the emulsion and the dispersed colorant are:

|  | % Relative Volume | Particle Size |
| --- | --- | --- |
| Emulsion | 10 | 0.44 |
|  | 50 | 0.89 |
|  | 90 | 1.80 |
| Dispersion | 10 | 0.45 |
|  | 50 | 1.09 |
|  | 90 | 2.25 |

The average particle size of the dispersion is about 1 micron.

If the above-described procedure is modified by dissolving the polymeric colorant in the methylene chloride and then adding the isopropanol, poly(alkylene glycol) and sodium stearate to the colorant solution followed by emulsification as described, the particle sizes and distribution of the resulting emulsion are:

| % Relative Volume | Particle Size |
| --- | --- |
| 10 | 0.55 |
| 50 | 2.89 |
| 90 | 8.01 |

Thus, the solvent system selected to dissolve the polymeric colorant is important to achieving the smallest particle sizes.

EXAMPLE 2

To a solution of the polymeric colorant (5.4 g) of Reference Example 1 in a mixture of methylene chloride (25.95 g) and isopropanol (8.65 g) at 25° C. is added Tergitol XH surfactant (0.54 g). The resulting solution is added with vigorous stirring to water (60.0 g; 25° C.) containing a dispersion of sodium stearate (0.1 g). Immediately thereafter, the mixture is treated with ultrasound for 1 minute at a temperature not greater than 40° C. using a Branson, Model 184V, ultrasonic device. The emulsion is transferred to a laboratory Rotovap apparatus and the methylene chloride and isopropanol are removed over a temperature of 25.40° C. and a pressure of 100 to 650 torr. The polymeric colorant dispersion thus obtained is passed through a 230 mesh screen to remove any polymeric colorant not emulsified. The solids content (determined gravimetrically) of the aqueous dispersion is 6.8 weight percent and the particle size distribution of the dispersed colorant is:

| % Relative Volume | Particle Size |
| --- | --- |
| 10 | 0.43 |
| 50 | 0.97 |
| 90 | 3.53 |

EXAMPLE 3-6

The procedure described in Example 2 is repeated 3 times substituting 0.54 g of the following nonionic surfactants for the tergitol XH poly(oxyalkylene glycol:

| Example | Nonionic Surfactant |
| --- | --- |
| 3 | Tween 60, an ethoxylated sorbitan monostearate having an average molecular weight of 1310 and a HLB value of 14.9. |
| 4 | Pluronic F127, a poly(oxyethylene/oxypropylene)glycol block copolymer having an average molecular weight of 12,500 and an HLB value of 22.0. |
| 5 | Tween 21, an ethoxylated sorbitan monostearate having an average molecular weight of 606 and a HLB value of 13.3. |

In Example 6, the procedure of Example 2 is repeated except that no nonionic surfactant is used. The particle sizes and particle size distribution of the polymeric colorant in and the solids content (weight percent) of the aqueous dispersions obtained are set forth in Table I.

TABLE I

| Example | Particle Size | | | Solids Content |
| --- | --- | --- | --- | --- |
|  | 10% | 50% | 90% |  |
| 3 | 0.46 | 1.18 | 3.15 | 10.0 |
| 4 | 0.50 | 1.78 | 3.86 | 7.7 |
| 5 | 2.23 | 6.70 | 12.90 | 8.0 |

TABLE I-continued

| Example | Particle Size 10% | Particle Size 50% | Particle Size 90% | Solids Content |
|---|---|---|---|---|
| 6 | 0.48 | 2.33 | 6.69 | 4.7 |

In Examples 5 and 6, during measurement the particle size increases with time, indicating particle agglomeration. Examples 3-6 demonstrate the advantages with respect to particle size of using a preferred nonionic surfactant. However, all of the dispersions prepared are useful for one or more of the purposes described hereinabove.

EXAMPLE 7

A solution of the polymeric colorant (5.3 g) of Reference Example 5 and Tergitol XH (0.53 g) in a mixture of methylene chloride (25.5 g) and isopropanol (8.5 g) at 25° C. is added slowly with vigorous stirring to water (60 g) containing sodium stearate (0.1 g) dispersed therein by ultrasonic means. Immediately thereafter, the mixture is treated with ultrasound for 1 minute at a temperature not greater than 40° C. using a Branson, Model 184V, ultrasonic device. The emulsion is transferred to a laboratory Rotovap apparatus and the methylene chloride and isopropanol are removed at a temperature not greater than 40° C. and a pressure of 100-650 torr. The polymeric colorant dispersion thus obtained is passed through a fritted-glass filter to remove any unemulsified polymeric colorant present before particle size measurement. The solids content of the aqueous dispersion is 10.7 weight percent and the particle sizes and distribution of the dispersed colorant are:

| % Relative Volume | Particle Size |
|---|---|
| 10 | 0.20 |
| 50 | 0.69 |
| 90 | 2.56 |

The average particle size of the dispersion is 1.1 microns.

EXAMPLE 8

The procedure described in Example 7 is repeated except that the Tergitol XH is omitted. The particle size distribution of the resulting polymeric colorant dispersion is:

| % Relative Volume | Particle Size |
|---|---|
| 10 | 1.72 |
| 50 | 5.39 |
| 90 | 9.95 |

Repeated particle size measurements show that the particle size increases with time, indicating particle agglomeration. The solids content of the dispersion, determined gravimetrically, is 9.7 weight percent.

EXAMPLE 9

The procedure of Example 8 is repeated using as the organic phase 40.0 g of a solution of the polymeric colorant of Reference Example 2 (50.0 g) in methylene chloride (420 g) and isopropanol (80.0 g) with Tergitol XH (0.36 g) dissolved in the 40 g portion. The solids content of the aqueous dispersion obtained is 7.5 weight percent and the particle size distribution of the dispersed polymeric colorant is:

| % Relative Volume | Particle Size |
|---|---|
| 10 | 0.14 |
| 50 | 0.33 |
| 90 | 1.32 |

Average particle size is 0.51 micron.

EXAMPLE 10

This example demonstrates the preparation of a dispersion wherein a phase inversion occurs in the preparation of the intermediate emulsion.

To a solution of the polymeric colorant (50.0 g) of Reference Example 6 and Tergitol XH (5.0 g) in a mixture of methylene chloride (300.0 g) and isopropanol (100 g) at 25° C. is added slowly water having sodium stearate dispersed therein (1.0 g sodium stearate in 600 g water) by means of a Ross homogenizer while subjecting the mixture to the comminuting force of a Ross homogenizer. At the phase inversion, indicated by a sudden decrease in viscosity, water addition is stopped. The amount of the aqueous sodium stearate dispersion added is 325 g. The emulsion thus produced is transferred to a laboratory Rotovap apparatus and the methylene chloride and isopropanol are removed at 35° C. and 100-650 torr. The aqueous dispersion is filtered through a 325 mesh screen. The solids content is 11.9 weight percent and the particle size distribution of the dispersion is:

| % Relative Volume | Particle Size |
|---|---|
| 10 | 0.45 |
| 50 | 0.96 |
| 90 | 2.28 |

EXAMPLE 11

The procedure of Example 10 is increased in scale by a factor of 3.5. The solids content of the dispersion obtained is 13.7 weight percent and the particle size distribution of the polymeric colorant is:

| % Relative Volume | Particle Size |
|---|---|
| 10 | 0.44 |
| 50 | 0.91 |
| 90 | 2.26 |

EXAMPLE 12

The procedure of Example 10 is repeated using a solution of the polymeric colorant (50.0 g) of Reference Example 3 and Tergitol XH (5.0 g) in a mixture of methylene chloride (240.0 g) and isopropanol (80 g). The amount of the aqueous sodium stearate dispersion used to make the emulsion is 289 g. Particle size is measured after most of the organic solvent has been removed (solids content of 14.0 weight percent) and again when all of the organic solvent and some of the water has been removed to increase the solids content of the dispersion to 23 weight percent. The particle size distribution is:

| Solids | Particle Sizes | | |
|---|---|---|---|
| Content | 10% | 50% | 90% |
| 14 | 0.43 | 0.98 | 2.46 |
| 23 | 0.53 | 1.64 | 4.32 |

COMPARATIVE EXAMPLE 1

The procedure of Example 8 is repeated except that the sodium stearate is replaced with a poly(oxyethylene) 300-caprylic/capric glyceride composition (1.0 g; Softigen 767.Huls America, Inc.) having an average molecular weight of approximately 500 and a HLB value of 19. Immediately after the comminuting force is removed from the organic/aqueous mixture, the 2 phases separate. This example demonstrates the importance of the ionic or amphoteric surfactant.

COMPARATIVE EXAMPLE 2

To a solution of the polymeric colorant (50.0 g) of Reference Example 1 in a mixture of methylene chloride (240.0 g) and isopropanol (80.0 g) at 25° C. is added poly(oxyethylene) 20 sorbitan monostearate (5.0 g; Tween 60). Water (600 g) having glyceryl monostearate (1.0 g: Myvaplex 600 having an HLB value of 2.8) dispersed therein by means of a Ross mixer is added slowly to the solution of the polymeric colorant while subjecting the mixture to the comminuting force of a Ross mixer. There is no evidence of phase inversion and when the comminuting force is stopped the organic phase immediately separates from the aqueous phase.

EXAMPLE 13

This example demonstrates the use of the aqueous dispersion of polymeric colorant prepared in Example 9 in a oil-in-water lotion.

The following ingredients constituting the oil phase are heated to 80° C.:
10.0 g Myvatex Texturelite emulsifier
25.0 g Myverol glyceryl monostearate
20.0 g Emersol 132 fatty acids
10.0 g Arlacel 165 nonionic emulsifier
17.0 g Isopropyl palmitate
17.0 g Drake Oil No. 9 mineral oil
10.0 g Dow Corning 200 silicone oil The following ingredients constituting the water phase are blended together and heated to 80° C.:
831.7 g Deionized water
20.0 g Germaben IIE
10.0 g Propylene glycol The oil phase (80° C.) is mixed into the water phase (80° C.) using a high shear mixer to make an oil-in-water emulsion and then is allowed to cool while adding the remaining ingredients. The aqueous dispersion of polymeric colorant (7.3 g, at 25° C.) is added to the oil-in-water emulsion (at 60° C.) with continued high shear mixing. Vitamin E (10.0 g) and fragrance (2.0 g) are added to and stirred in the emulsion (at 50° C.). The entire mixture is mixed with a propeller mixer until the temperature reaches 32° C. The aqueous dispersion of the polymeric colorant imparts a very bright yellow color to the lotion.

EXAMPLE 14

The aqueous polymeric dispersion (40 g) prepared in Example 12 is stirred into 60 g of an aqueous- dispersion (32% solids) of a water-dispersible, sulfonate-containing, linear polyester (EASTEK polyester polymer) containing Acrylsol RM.825 viscosity modifier (1 g; Rohm & Haas). The mixture is homogeneous and the polymeric colorant particles remain suspended for several days. A drawdown (No. 2 RK drawdown rod on coated paper) of the mixture results in a smooth, homogeneously-colored, ink film.

EXAMPLE 15

The aqueous dispersion of polymeric colorant prepared in Example 11 is spray dried using an APV Anhydro A/S spray dryer, equipped with a centrifugal atomizer, at an inlet temperature of 30° C., an outlet temperature of 40° C. and a spray rate of 6.9 mL per minute. The dry, polymeric colorant composition is dispersed by adding water and shaking. The particle size distribution of the polymeric colorant particles is found to be:

| % Relative Volume | Particle Size |
|---|---|
| 10 | 5.25 |
| 50 | 11.24 |
| 90 | 19.56 |

The dry, polymeric colorant composition (20.0 g) is milled in castor oil (46.67 g) on a 3-roll mill for 3 passes and the fineness of the grind of the milled composition is determined on a NPIRI gage which shows that all particles of the polymeric colorant composition are 4 microns or less.

EXAMPLE 16

The aqueous dispersion of polymeric colorant prepared in Example 12 is-spray dried as described in Example 15 using an inlet temperature of 140° C., and outlet temperature of 84° C. and a spray rate of 39 mL per minute. The dry, polymeric colorant composition is milled in castor oil as described above to give a composition in which the particles of the polymeric colorant composition are 4 microns or less.

The castor oil dispersions of the dry, polymeric colorant compositions of Examples 11 and 12 are intimately mixed using a spatula on a glass plate with titanium dioxide in a dispersion:TiO$_2$ weight ratio of 3:1 to determine the color strength of the colorant compositions. The color strength of each colorant composition is found to be significantly greater than that of the powders of the polymeric compositions of the reference examples prepared by crystallization and grinding, e.g., by jet milling or cryogenic hammer milling.

EXAMPLE 17

The aqueous dispersions prepared in Examples 7 and 8 are air dried in an aluminum pan under ambient conditions. Each of the dry, polymeric colorant compositions (0.5 g) is milled in castor oil (1.0 g) on a Hoover muller (Hoover Color Corporation) for 8×50 revolutions with 150 pounds force. Each mixture then is intimately mixed using a spatula on a glass plate with titanium dioxide (3:1 weight ratio castor oil dispersion to titanium dioxide) to determine the color strength of the colorant compositions. The color strengths of the 2 colorant compositions is approximately the same and both possess significantly greater color strengths than do powders of the polymeric colorant of Reference Example 5 prepared by crystallization and grinding.

EXAMPLE 18

Tergitol XH surfactant (0.40 g) is dissolved in a solution of the polymeric colorant (4.0 g) of Reference Example 4 in a solvent system consisting of methylene chloride (30 g) and isopropanol (6 g) and the resulting solution is added slowly to a vigorously stirred dispersion of sodium stearate (0.10 g) in water (60 g). The resulting emulsion is treated with ultrasound to make fine particles and then the organic solvents are removed by distillation under reduced pressure at a temperature below 35° C. as described in the preceding examples. The aqueous dispersion of polymeric colorant (solids content =8.9 weight percent) produced is passed through a coarse fritted-glass filter prior to particle size measurement. The particle size distribution is:

| % Relative Volume | Particle Size |
|---|---|
| 10 | 0.16 |
| 50 | 0.44 |
| 90 | 0.91 |

The invention has been described in detail with particular reference to preferred embodiments thereof, but it will be understood that variations and modifications can be effected within the spirit and scope of the invention.

We claim:

1. A liquid-dispersible, polymeric colorant composition in the form of a powder comprising an intimate mixture of:
   I. a water-insoluble, polymeric colorant comprising a thermoplastic, polyester having copolymerized therein at least 5 weight percent, based on the weight of component I, of residues of one or more monomeric, organic colorant compounds;
   II. an ionic or amphoteric surfactant wherein the polymeric colorant has an average particle size of less than 2 microns; and
   III. a nonionic poly(oxyalkylene) surfactant having an average molecular weight of at least 300 and a hydrophobic-lipophobic balance value of about 10 or greater.

2. A composition according to claim 1 comprising:
   I. a water-insoluble, polymeric colorant comprising a linear, thermoplastic, polyester having copolymerized therein about 10 to 40 weight percent, based on the weight of component I, of residues of one or more monomeric, organic colorant compounds;
   II. an anionic surfactant wherein the polymeric colorant has an average particle size of less than 2 microns; and
   III. a nonionic poly(oxyalkylene) surfactant having an average molecular weight of about 1000 to 15,000 and a hydrophobic-lipophobic balance value of about 10 or greater.

3. A composition according to claim 2 comprising:
   I. a water-insoluble, polymeric colorant comprising a linear, thermoplastic, polyester having copolymerized therein about 10 to 40 weight percent, based on the weight of component I, of residues of one or more monomeric, organic colorant compounds wherein the polymeric colorant has an average particle size of less than 2 microns;
   II. about 1.0 to 10 weight percent, based on the weight of the polymeric colorant, of an alkali metal salt of a carboxylic acid containing about 12 to 24 carbon atoms; and
   III. about 1.0 to 20.0 weight percent, based on the weight of the polymeric colorant, of a nonionic poly(oxyalkylene) surfactant having an average molecular weight of about 1000 to 15,000 and a hydrophobic-lipophobic balance value of about 10 or greater.

4. An aqueous dispersion comprising a mixture of:
   (1) a water-insoluble, polymeric colorant comprising a thermoplastic, polyester having copolymerized therein at least 5 weight percent, based on the weight of the polymeric colorant, of residues of one or more monomeric, organic colorant compounds wherein the polymeric colorant has an average particle size of less than 2 microns;
   (2) an ionic or amphoteric surfactant;
   (3) a nonionic poly(oxyalkylene) surfactant having an average molecular weight of at least 300 and a hydrophobic-lipophobic balance value of about 10 or greater; and
   (4) water.

5. An aqueous dispersion according to claim 4 comprising:
   (1) a water-insoluble, polymeric colorant comprising a linear, thermoplastic, polyester having copolymerized therein about 10 to 40 weight percent, based on the weight of the polymeric colorant, of residues of one or more monomeric, organic colorant compounds wherein the polymeric colorant has an average particle size of less than 2 microns;
   (2) an anionic surfactant;
   (3) a nonionic poly(oxyalkylene) surfactant having an average molecular weight of about 1000 to 15,000 and a hydrophobic-lipophobic balance value of about 10 or greater; and
   (4) water.

6. An aqueous dispersion according to claim 4 comprising:
   (1) a water-insoluble, polymeric colorant comprising a linear, thermoplastic, polyester having copolymerized therein about 10 to 40 weight percent, based on the weight of the polymeric colorant, of residues of one or more monomeric, organic colorant compounds wherein the polymeric colorant has an average particle size of less than 2 microns;
   (2) about 1.0 to 10 weight percent, based on the weight of the polymeric colorant, of an alkali metal salt of a carboxylic acid having about 12 to 24 carbon atoms;
   (3) about 1.0 to 20.0 weight percent, based on the weight of the polymeric colorant, of a nonionic poly(oxyalkylene) surfactant having an average molecular weight of about 1000 to 15,000 and a hydrophobic-lipophobic balance value of about 10 or greater; and
   (4) water.

7. An aqueous dispersion according to claim 4 comprising:
   (1) about 10 to 20 weight percent, based on the total weight of the dispersion, of a water-insoluble, polymeric colorant comprising a linear, thermoplastic, polyester having copolymerized therein about 10 to 40 weight percent, based on the weight of the polymeric colorant, of residues of one or more monomeric, organic colorant compounds wherein the polymeric colorant has an average particle size of less than 2 microns;
(2) about 1.0 to 10 weight percent, based on the weight of the polymeric colorant, of an alkali metal salt of a carboxylic acid having about 16 to 20 carbon atoms;
(3) about 1.0 to 20.0 weight percent, based on the weight of the polymeric colorant, of a nonionic poly(oxyalkylene) surfactant having an average molecular weight of about 1000 to 15,000 and a hydrophobic-lipophobic balance value of about 10 or greater; and
(4) water; wherein the total weight percent of components (2) and (3) is about 2.0 to 20 weight percent based on the total weight of components (1), (2) and (3).

* * * * *

UNITED STATES PATENT AND TRADEMARK OFFICE
CERTIFICATE OF CORRECTION

PATENT NO. : 5,043,376

DATED : 8-27-91

INVENTOR(S) : Mahendra K. Sharma, Terry A. Oldfield, James J. Krutak

It is certified that error appears in the above-identified patent and that said Letters Patent is hereby corrected as shown below:

Claim 1, column 19, line 42, after "compounds" and before the ";" insert ---wherein the polymeric colorant has an average particle size of less than 2 microns---.

line 43, after "surfactant" and before the ";" on line 45, delete "wherein the polymeric colorant has an average particle size of less than 2 microns".

Claim 2, column 19, line 55, after "compounds" and before the ";" insert ---wherein the polymeric colorant has an average particle size of less than 2 microns---.

line 56, after "surfactant" and before the ";" on line 58, delete "wherein the polymeric colorant has an average particle size of less than 2 microns".

Signed and Sealed this

Eighteenth Day of May, 1993

Attest:

MICHAEL K. KIRK

*Attesting Officer*  *Acting Commissioner of Patents and Trademarks*